United States Patent [19]
Walacavage

[11] Patent Number: 5,368,248
[45] Date of Patent: Nov. 29, 1994

[54] FISHING REEL WITH VARIABLY YIELDABLE WIND LAG

[76] Inventor: Adolph C. Walacavage, 5155 Co. Rd. 6, Gulf Shores, Ala. 36542

[21] Appl. No.: 979,317

[22] Filed: Nov. 20, 1992

[51] Int. Cl.$^5$ .............................................. A01K 89/00
[52] U.S. Cl. ................................... 242/283; 242/323
[58] Field of Search ............... 242/223, 245, 246, 283, 242/323

[56] References Cited

U.S. PATENT DOCUMENTS

| | | | |
|---|---|---|---|
| 2,783,862 | 3/1957 | Perinoni | 192/14 |
| 3,429,521 | 2/1969 | Jones | 242/84.54 |
| 3,804,349 | 4/1974 | Serini et al. | 242/84.5 A |
| 4,702,431 | 10/1987 | Kaneko | 242/246 |
| 4,804,150 | 2/1989 | Takeuchi | 242/245 |
| 4,840,327 | 6/1989 | Kaneko | 242/223 |
| 4,996,789 | 3/1991 | Hoover | 43/24 |
| 5,125,593 | 6/1992 | Toda | 242/223 |

Primary Examiner—Daniel P. Stodola
Assistant Examiner—Eileen A. Dunn
Attorney, Agent, or Firm—Jacobson, Price, Holman & Stern

[57] ABSTRACT

A limited relative rotation drive connection is provided between the rotary torque input member of a fishing reel and the rotary line winding member of the reel with the limited relative rotation drive connection including spring structure yieldingly biasing the rotary line winding member ahead in relation to the rotary torque input member in the direction of rotation which effects inwinding of the associated fishing line and the biasing action of the spring on the rotary line winding member is adjustable.

11 Claims, 4 Drawing Sheets

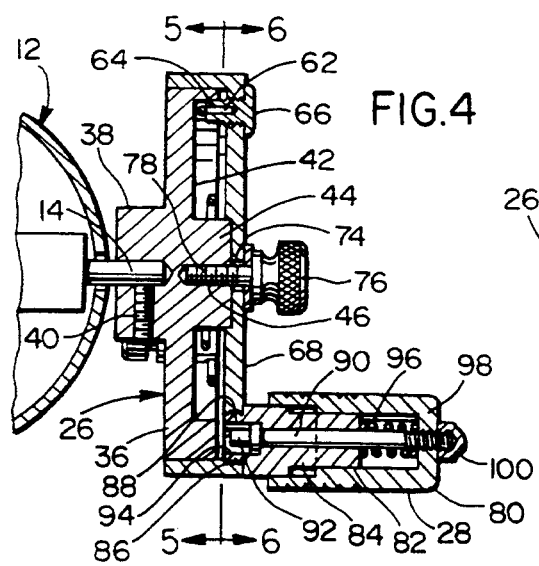
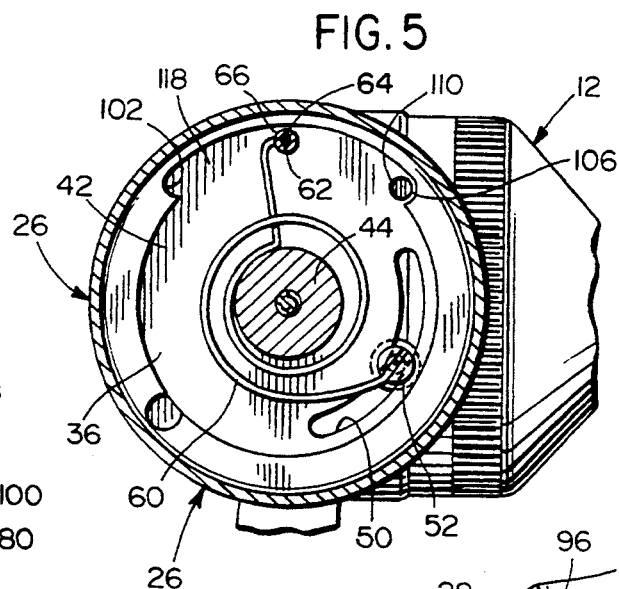
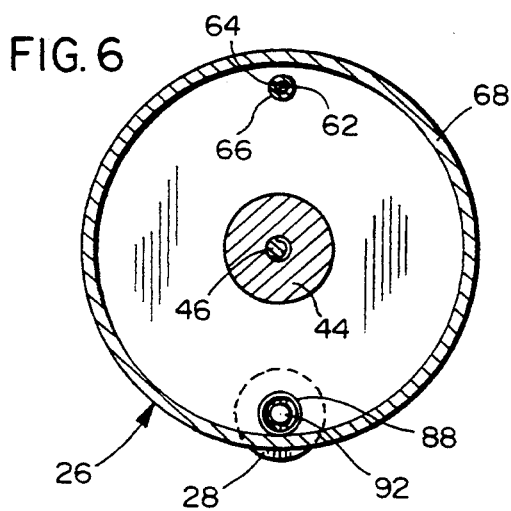
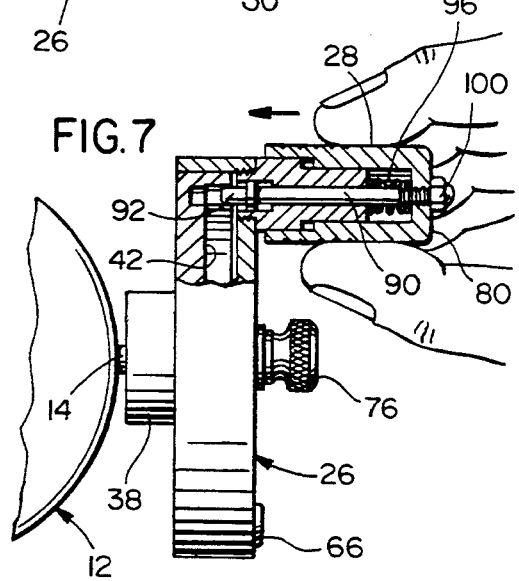
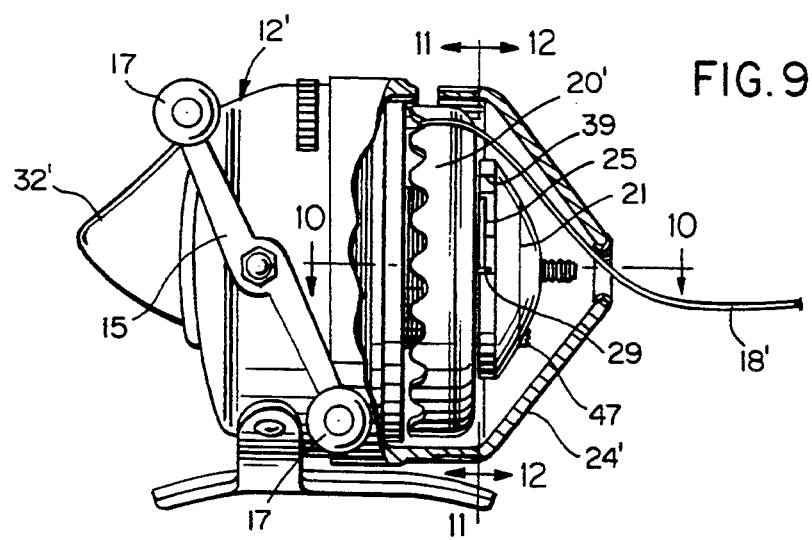

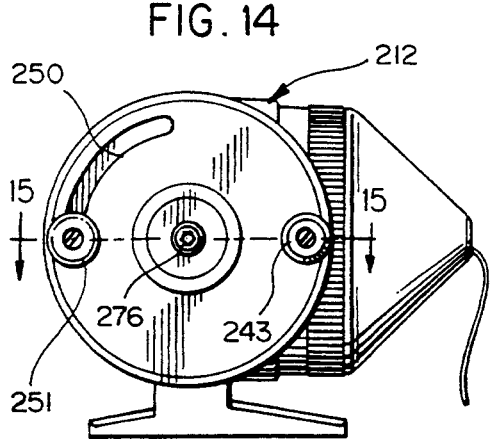
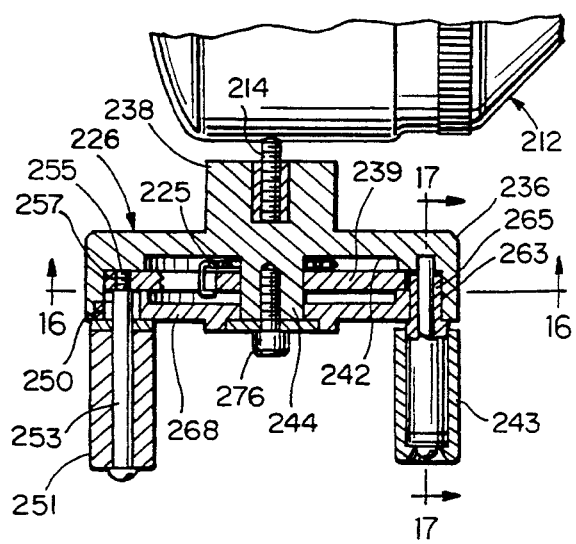
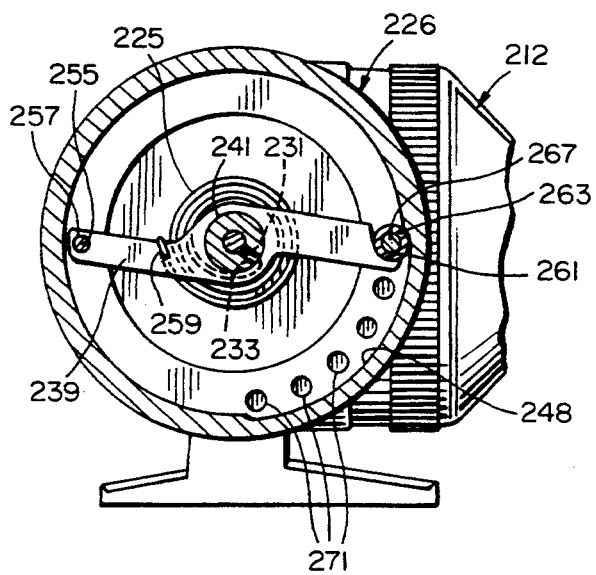
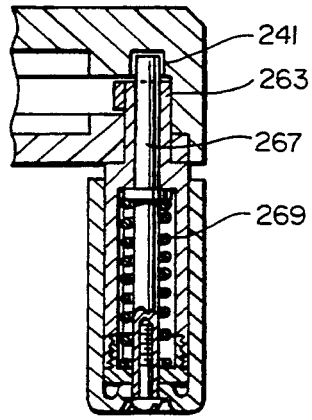
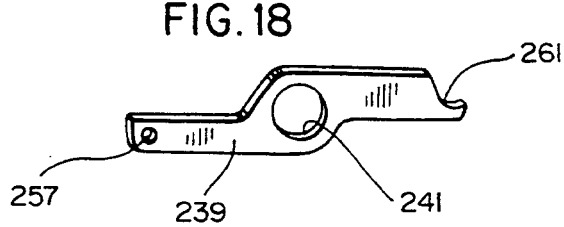

FISHING REEL WITH VARIABLY YIELDABLE WIND LAG

BACKGROUND OF THE INVENTION

1. Field of the Invention

This invention relates to a fishing reel which includes, in addition to and/or independent of an adjustable drag mechanism, structure by which the drive train or connection between a rotary torque input member and a line winding member driven thereby includes a limited freedom of rotation connection incorporating force means yieldably biasing the winding member ahead relative to the rotary torque input member in the direction of rotation in which the winding member moves when winding in the corresponding fishing line.

2. Description of Related Art

U.S. Pat. No. 4,996,789 to Hoover discloses a fishing rod arrangement for "setting" a hook in a fish's mouth and for maintaining tension on a fishing line while the fish is being reeled in. The preferred embodiment includes a reel having a multiple turn leaf spring which is wound by turning a large knurled rim. Of particular relevance, is column 3, lines 52–54, where the patent mentions that "the spring tension on the line will help in landing the fish, that is, the spring bias maintains tension drawing the fish toward the pole." The arrangement, however, does not describe the winding action of the present invention.

U.S. Pat. No. 2,783,862 to Perinoni discloses a spirally wound spring in a fishing reel arrangement. Here, however, the spring is used to limit reverse (counterclockwise) movement of the cranking handle, thereby providing a set drag during line "takeout".

U.S. Pat. No. 3,429,521 to Jones discloses a fishing reel having a coil spring which is loosely wound around a drive shaft. The coil spring operates as a clutch. When the hand crank is rotated clockwise to take-up line, the spring contracts and frictionally engages the drive shaft thereby transmitting the crank's rotation to the drive shaft. According to the patent, column 4, lines 13–17, in playing a fish with this reel, it is possible to vary the force on the hand crank and exert a selectively variable drag on the drive shaft permitting the fish to strip out line against a selected holding force. Operation of the reel during line retrieval is specifically set forth in column 3, line 74, to column 4, line 17, of the patent.

U.S. Pat. No. 3,804,349 to Serini et al. discloses an apparatus for controlling the tension of the line in a fishing reel. The apparatus provides a braking mechanism for controlling tension during line take-out, not line retrieval.

SUMMARY OF THE INVENTION

The fishing reel of the instant invention herein disclosed is illustrated and described in four separate forms. The first form utilizes an exterior modified drive connection between the rotary torque input crank and the rotary torque input shaft of an otherwise conventional spinning reel, the second form utilizes an internal modified drive connection between the rotary torque input shaft and the line winding member of a spinning reel, the third form incorporates an external modified drive connection between the rotary torque input crank of a bait casting reel and the line winding spool thereof and the fourth form comprises a modified form of the first form.

The main object of this invention is to provide a limited freedom of rotation connection between the rotary torque input member of a fishing reel and the rotary line winding member of the reel with the limited freedom of rotation connection including force means yieldingly biasing the rotary line winding member ahead in relation to the rotary torque input member in the direction of rotation which effects in-winding of the associated fishing line.

Another object of this invention is to provide a limited freedom of rotation connection in accordance with the preceding object and which may be incorporated into various different types of fishing reels.

Still another object of this invention is to provide a freedom of rotation connection in accordance with the first mentioned object incorporating adjustment structure by which the yielding action of the force means thereof may be varied.

A further object of this invention is to provide a limited freedom of rotation connection between the rotary torque input member of a fishing reel and the line winding member thereof in accordance with the preceding objects and which may be selectively deactivated.

A final object of this invention to be specifically enumerated herein is to provide a limited freedom of rotation connection between the rotary torque input member and the line winding member of a fishing reel which will conform to conventional forms of manufactured, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a vertical sectional view taken substantially upon the plane indicated by the section line 4—4 of FIG. 1;

FIG. 5 is a vertical section view taken substantially upon the plane indicated by the section line 5—5 of FIG. 4;

FIG. 6 is a vertical sectional view taken substantially upon the plane indicated by the section line 6—6 of FIG. 4;

FIG. 7 is an elevational view illustrating the limited freedom of rotation connection with parts thereof being broken away and illustrated in vertical section showing the manner in which the limited freedom of rotation connection may be deactivated;

FIG. 9 is a side elevational view of a spin casting reel illustrating a second form of the invention incorporating an internal limited freedom of rotation connection between the rotary torque input shaft of the reel and the line winding member thereof;

FIG. 14 is a side elevational view of a further spin casting reel similar to that illustrated in FIGS. 1-8, but incorporating a slightly modified form of limited freedom of rotation connection;

FIG. 15 is an enlarged horizontal sectional view taken substantially upon a plane indicated by the section line 15—15 of FIG. 14;

FIG. 16 is a vertical sectional view taken substantially upon a plane indicated by the section line 16—16 of FIG. 15;

FIG. 17 is an enlarged vertical sectional view taken substantially upon a plane indicated by the section line 17—17 of FIG. 16; and FIG. 18 is a perspective view of the rotary torque transfer lever shown in FIGS. 15 and 16.

DESCRIPTION OF THE PREFERRED EMBODIMENTS

Figure 1:
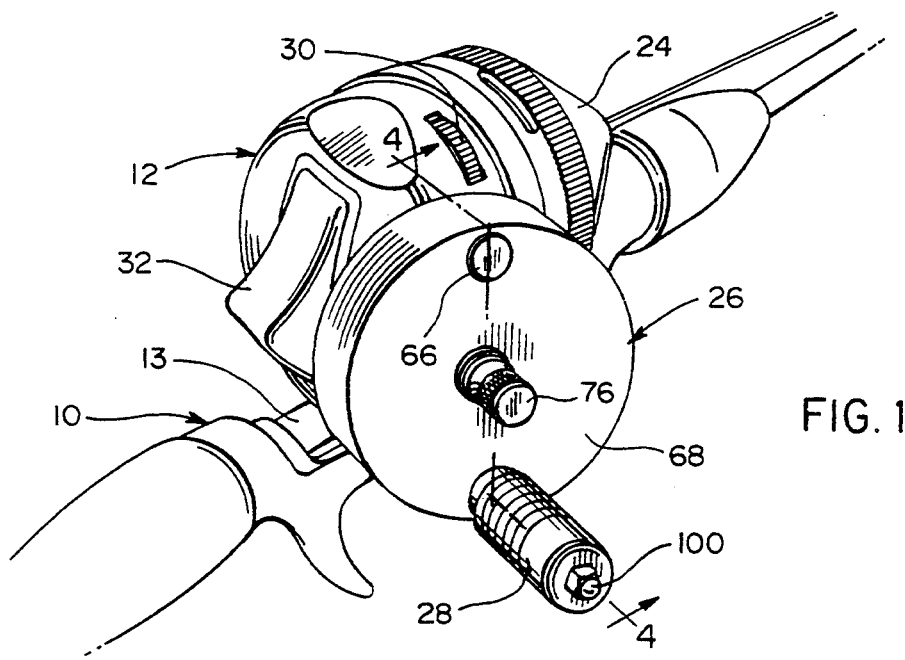
FIG. 1 is a perspective view of a rod mounted spin casting reel of convention construction and incorporating a first form of freedom of rotation connection or drive train between the rotary torque input crank and the line winding member of the reel.
Figure 2:
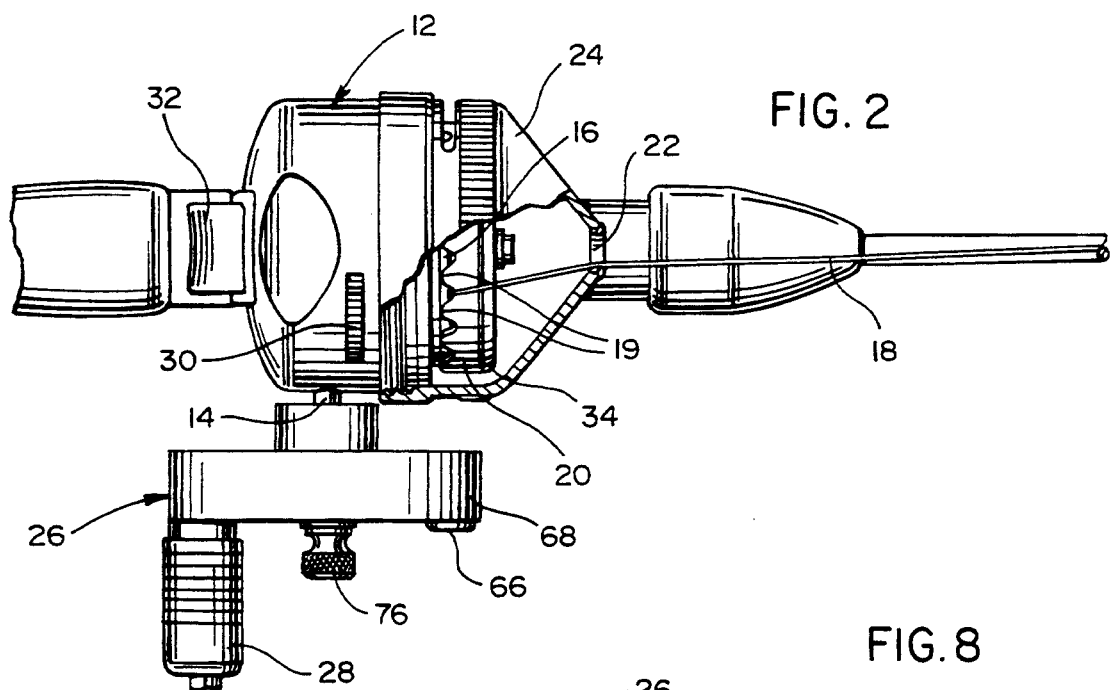
FIG. 2 is a top plan view of the assembly illustrated in FIG. 1 with portions of the cover of the reel broken away and illustrated in horizontal section showing the rotary line winding member of the reel.
Figure 3:
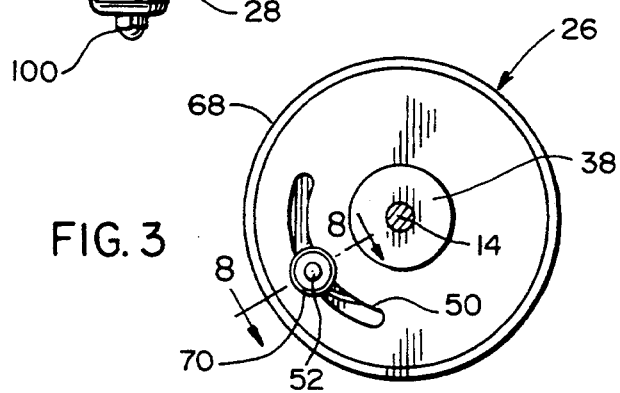
FIG. 3 is a vertical sectional view taken substantially upon the plane indicated by the section line 3—3 of FIG. 2.
Figure 8:
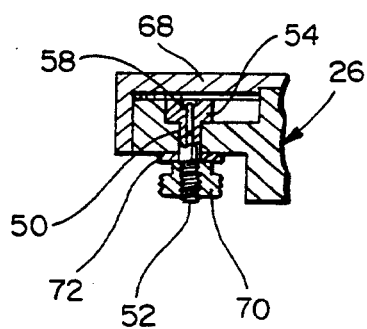
FIG. 8 is an enlarge fragmentary sectional view taken substantially upon the plane indicated by the section line 8—8 of FIG. 3.
Figure 10:
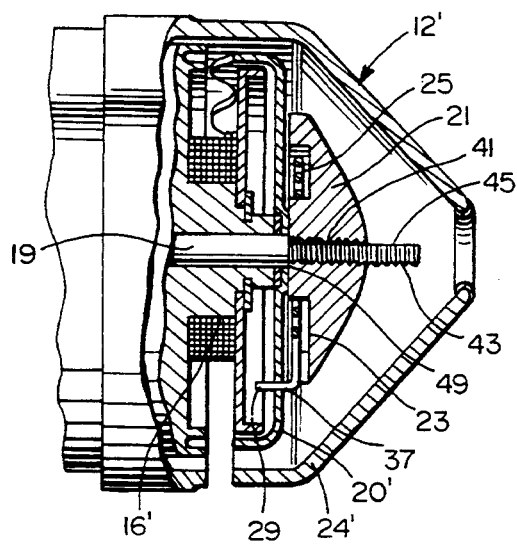
FIG. 10 is horizontal sectional view taken substantially upon the plane indicated by the section line 10—10 of FIG. 9.
Figure 11:
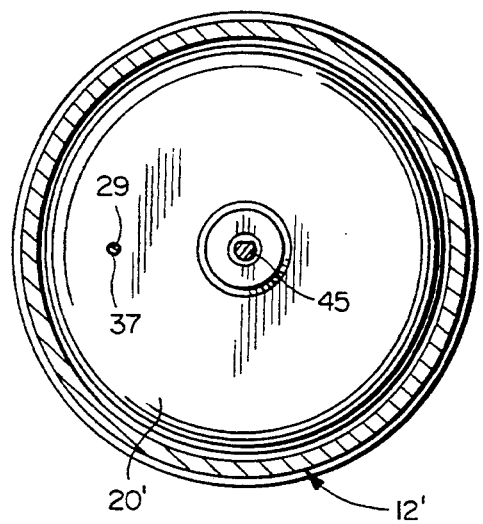
FIG. 11 is a vertical sectional view taken substantially upon the plane indicated by the section line 11—11 of FIG. 9.
Figure 12:
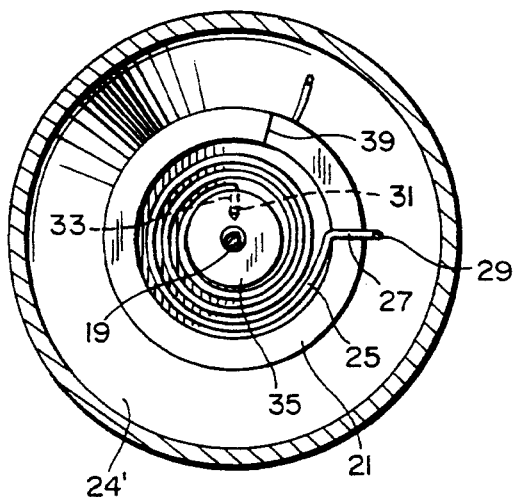
FIG. 12 is a vertical section view taken substantially upon the plane indicated by the section line 12—12 of FIG. 9.

Referring now more specifically to FIGS. 1-8 of the drawings the numeral 10 generally designates a conventional form of fishing rod having a typical spin casting reel referred to in general by the reference numeral 12 mounted thereon through the use of a mounting portion 13. The spin casting reel 12 includes an exterior rotary torque input shaft 14 upon which a handle similar to that indicated at 15 in FIG. 9 usually is mounted. The handle 15 comprises a double ended crank lever having its longitudinal midportion removably mounted upon an associated rotary torque input shaft and the opposite ends of the handle 15 include rotatably mounted finger engaging knobs 17.

The reel 12 of FIGS. 1-8 includes a stationary spool 16 upon which a length of fishing line is partially wound, the free end 18 of the fishing line passing radially outwardly from the spool 16, between peripherally adjacent teeth 19 of a rotary line winding member 20 and then exiting through the eyelet 22 supported from the forward end of the cover 24 of the reel 12.

The reel 12 has been modified by removing the original handle thereof corresponding to the handle 15 and by replacing the original handle with the limited relative rotation drive connection referred to in general by the reference numeral 26. The drive connection 26 includes a finger grip or knob 28 corresponding to either of the finger grips or knobs 17 and through which rotary input torque may be applied to the shaft 14. The shaft 14 is conventionally drivingly connected to the rotary line winding member 20 for rotation thereof responsive to rotation of the rotary torque input shaft 14. As is conventional, the reel 12 also includes a conventional drag mechanism which may be adjusted by turning the partially exposed thumb wheel 30 and a push button 32 which is depressed by the thumb of the user when preparing to cast and is released by the user as the rod 10 moves forward at the end of the casting motion. Depressing the button 32 forwardly displaces the rotary line winding member to a position forward of that portion of the spool 16 from which the line free end 18 pays out during a cast, but clamps the fishing line end 18 between the rounded forward end 34 of the rotary line winding member 20 and the opposing inner surfaces of the cover 24 until such time as thumb pressure on the button 32 is released. Then, the fishing line end 18 is freed to pay out from the spool 16 through the eyelet 22. After the cast has been completed, rotation of the rotary torque input shaft 14 in a direction to wind in the line free end 18 releases the rotary line winding member for movement back to the position thereof illustrated in FIG. 2 with the line free end 18 disposed between adjacent rounded teeth 19 and rotation of the line winding member 20 causes the free end 18 of the line to be wound back upon the spool 16.

The foregoing comprises a description of a conventional form of spin casting reel such as the "ZEBCO 404" spin casting reel, except for the mounting of the drive connection 26 on the rotary torque input shaft 14 thereof in lieu of a conventional handle such as that illustrated at 15 in FIG. 9. Accordingly, it will become apparent that the first form of the instant invention illustrated in FIGS. 1-8 of the drawings may be realized merely by substituting for a conventional handle, such as that illustrated at 15 in FIG. 9, the drive connection referred to in general by the reference numeral 26 and illustrated in FIGS. 1-8.

The drive connection 26 includes a first disk shaped member 36 including a centrally bored mounting boss 38 equipped with a set screw 40 and the mounting boss 38 is mounted upon the rotary torque input shaft 14 and fixed in position thereon by the set screw 40.

The disk shaped member 36, on the outer side thereof, defines an angular recess 42 having a center mounting boss 44 equipped with a central threaded blind bore 46 and the annular recess 42 includes a radially outwardly enlarged portion 48 of approximately 90° in angular extent. In addition, the disk shaped member 36 includes an arcuate slot 50 formed therein having the threaded blind bore 46 as its center of curvature and the slot 50 opens into the recess 42 and also is of approximately 90° in angular extent, the slot 50 being angularly offset from the radially outwardly enlarged portion 48.

A clamp-type anchor lug 52 is slidably received through the slot 50 and includes an inner side head 54 equipped with an axial blind bore 56 opening outward of the head 54 in communication with a radial notch 58 formed in the head 54.

A coiled wire spring 60 is disposed about the mounting boss 44 within the recess 42 and has one end thereof anchored in the notch 58 and the blind bore 56 of the lug 52 while the other end of the coiled wire spring 60 includes a right angled terminal end 62 projecting outwardly of the recess 42 and seated in a blind bore 64 formed axially in the inner end of an anchor pin 66 carried by an annular cover plate 68 telescoped over the outer side of the disk shaped member 36 and closing the recess 42 from the outer side thereof.

The end of the anchor lug 52 remote from the head 54 projects through the slot 50 and has a threaded nut 70 and a washer 72 disposed thereon, the central portion of the cover plate 68 having a bore 74 formed therethrough registered with the threaded blind bore 46 and a thumb nut 76 is provided and has its threaded shank 78 passed through the bore 74 and threadingly engaged in the threaded blind bore 46.

The finger grip 28 comprises a cylindrical cap 80 telescopingly secured over the outer end 82 of a cylindrical fitting 84. The fitting 84 includes a diametrically reduced and externally threaded inner end 86 threadingly engaged in a threaded bore 88 formed in the cover plate 68 adjacent the outer periphery thereof and a headed pin 90 has its head 92 telescopingly received in a counter bore 94 formed in the inner end of the cylindrical fitting 84, a compression spring 96 being disposed about the end of the pin 90 projecting outwardly of the outer end of the cylindrical fitting 84 and bearing against the outer end wall 98 of the cap 80, the outer end of the pin 90 being threaded through the end wall 98 and having a jam nut 100 threadedly engaged thereon.

With attention now invited more specifically to FIG. 5, the anchor pin 66 usually is urged to the left terminal end 102 of the portion 48 of the recess 42 under the biasing action of the spring 60 and the biasing action of the spring 60 may be varied by loosening the anchor lug 52 and sliding the latter to a different position relative to the slot 50 and then retightening the lug 52.

The cap 80 of the finger grip 28 normally is rotated, with the cover plate 68, in a clockwise direction as viewed in FIG. 5 in order to wind in the free end 18 of the fishing line. As the cap 80 is rotated in a clockwise direction, the rotary torque applied thereto is transferred to the disk shaped member 36 through the spring 60, the closure plate being rotatable relative to the disk shaped member 36 through an arch of approximately 90° as the anchor pin 62 swings between the opposite ends of the radially outwardly enlarged portion 48 of the recess 42.

If there is no resistance to in-winding of the free end 18 of the fishing line, the anchor pin 66 remains seated within the left terminal end 102 of the portion 48 of the recess 42. However, if there is slight resistance to the in-winding of the free end 18 of the fishing line, such resistance will cause the disk shaped member 36 to trail in its clockwise rotation in relation to the cover plate 68 driven by the finger grip 28, the yieldable resistance to such trailing action being determined by the adjustment of the anchor lug 52 in the slot 50. Further, the spring biased limited freedom of rotation connection 26 between the finger grip 28 and the winding member 20 is in addition to the usual adjustable drag feature of the reel 12.

The limited freedom of rotation connection 26 offers, in addition to the usual adjustable drag and the flexibility of the tip of the associated rod 10, an additional "light touch" fishing action to be used by a person fishing with the rod 10.

If it is desired, once a fish is hooked and is being reeled in with sufficient rotary torque input to the finger grip 28 to cause the anchor pin 66 to swing to the right terminal end 106 of the portion 48 of the recess 42 illustrated in FIG. 5, inward pressure on the cap 80 in the direction of the arrow 108 as shown in FIG. 7 will cause the head 92 of the pin 90 to be inwardly displaced into the recess 110 formed in the disk member 36 at the right terminal end 106 of the portion 48 of the recess 42, thus positively locking the cover plate 68 to the disk shaped member 36 and disabling the limited freedom of rotation connection between the cap 80 and the rotary torque input shaft 14.

With attention now invited more specifically to FIGS. 9-12, there may be seen a second spin casting reel referred to in general by the reference numeral 12' upon whose rotary torque input shaft (not shown) the handle 15 is removable mounted. The reel 12' includes a rotary shaft 19 driven by suitable drive train means (not shown) from the handle 15 and the shaft 19 is rotatably received through the center of the spool 16' corresponding to the spool 16. A line winding member 20' corresponding to the line winding member 20 is mounted on the shaft 19 for rotation relative thereto and the spool 16' and the shaft 19 are axially shiftable upon arcuation of the thumb button 32' corresponding to the button 32.

The reel 12' comprises a modified "ZEBCO 202" reel wherein the front cone 21 has been provided with an annular recess 23 on its rear side to accommodate a coil spring 25 whose outer convolution includes an outturned extension 27 terminating in a rearwardly directed terminal end 29 and whose inner convolution includes an inturned terminal end 31 anchored in a radial blind bore 33 formed in the central hub portion 35 of the front cone 21. The terminal end 29 is anchored within a bore 37 formed in the winding member 20' and the extension 27 extends radially outwardly through a radial window 39 formed in the rear side of the front cone 21 communicating the outer periphery of the front cone 21 with the outer periphery of the recess 23.

The front cone 21 is provided with a central threaded bore 41 by which the cone 21 is mounted upon the diametrically reduced and threaded forward end 43 of the shaft 19, the forward end 43 including a longitudinal flat 45 thereon with which a radial set screw 47 (see FIG. 9) carried by the front cone 21 is engaged.

The front cone 21 is not quite fully tightened against the shoulder 49 and, accordingly, the drive train between the handle 16 and the winding member 20' includes the shaft 19, the front cone 21 and the spring 25. Accordingly, depending upon the angular extent of the window 39, the winding member 20' may be angularly displaced relative to the shaft 19 in a direction to unwind the associated fishing line from the spool 16', the tension of the spring 25 being adjustable by dismantling the cover 24' from the reel 12', removing the front cone 21 and then increasing or decreasing the wind of the spring 25 on the front cone 21.

Thus, it may be seen that the reel 12' functions in substantially the same manner as the reel 12 except that the limited freedom of rotation connection of the reel 12' occurs between the winding member 20' and the front cone 21, whereas the limited freedom of rotation connection of the reel 12 occurs between the cover plate 68 and the disk shaped member 36.

Figure 13:
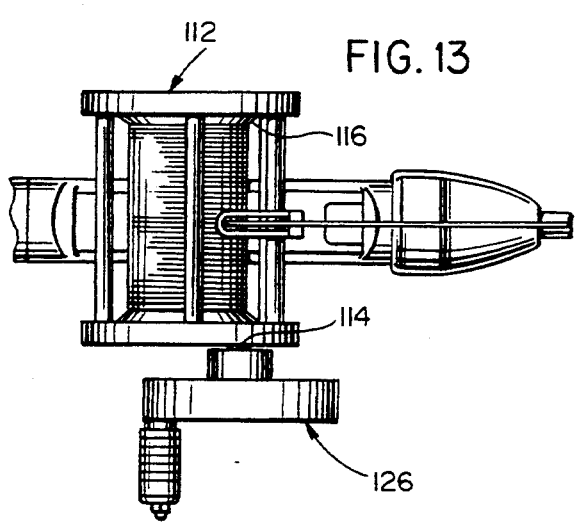
FIG. 13 is a top plane view of a bait casting reel incorporating a limited freedom of rotation connection between the rotary torque input member of the reel and the line winding member thereof, the limited freedom of rotation connection structure being substantially identical to that illustrated in FIGS. 1-8.

With attention invited now more specifically to FIG. 13, it may be seen that a conventional bait casting reel referred to in general by the reference 112 and including a spool 116 in the form of a winding member corresponding to the winding member 20 may have a limited freedom of rotation drive connection 126 corresponding to the limited freedom of rotation drive connection 26 removably mounted upon the rotary torque input shaft 114 of the reel 112. Thus, a conventional bait casting reel such as that indicated at 112 also may be modified in accordance with the present invention.

Referring now more specifically to FIGS. 14–18, there may be seen a fishing reel referred to in general by the reference numeral 212 and which is substantially identical to the reel 12, except that the limited freedom of rotation drive connection 226 of the reel 212 is structured slightly differently from the limited freedom of rotation drive connection 26 of the reel 12.

Various components of the reel 212 and the limited freedom of rotation drive connection 26 corresponding directly to similar components of the reel 12 and the drive connection 26 are referred to by corresponding reference numerals in the 200 series.

The annular recess 242 of the disk shaped member 236 defines a center mounting boss 244 corresponding to the boss 44 and an annular cover plate 268 is secured to the central mounting boss 244 through the utilization of a thumb nut 276 corresponding to the thumb nut 76. The central mounting boss 244 includes a radial blind bore 233 in which an inturned terminal end 231 of a coiled spring 225 is seated and an elongated lever 239 is provided including a midlength transverse bore 241 by which the lever 239 is journaled on the center mounting boss 244.

The cover plate 268 includes a crank handle 243 supported therefrom and the cover plate 268 includes an arcuate slot 250 corresponding, somewhat, to the slot 50. Further, the cover plate additionally includes a second crank handle 251 including a cylindrical shank 253 slidably received through the slot 250 and including a diametrically reduced threaded terminal end 255 which is threaded into a threaded bore 257 formed through one end of the lever 239. The end of the spring 225 remote from the terminal end 231 thereof is hooked as at 259, see FIG. 16, and engaged with midlength portion of the end of the lever 239 in which the bore 257 is formed.

The end of the lever 239 remote from the bore 257 is provided with a notch 261 engagable by a cylindrical boss 263 carried by the crank handle 243 as a stationary component of the cover plate 268. The boss 263 defines a bore 265 therethrough in which a anchor pin 267 is reciprocal, the anchor pin 267 being spring biased as at 269 and being retractable relative to the cylindrical boss 263 against the biasing action of the spring 269. When the anchor pin 267 is extended under the biasing action of the spring 269 in the manner illustrated in FIG. 17 of the drawings, the anchor pin 267 is engagable in one of the peripherally arranged cylindrical blind recesses 271 formed in the inner side of the disk shaped member 236 in the enlarged portion 248 of the annular recess 242.

Depending upon the cylindrical blind recess 271 in which the anchor pin 276 is seated, the tension of the spring 225 on the lever 239 is varied.

When it is desired to rotate the disk shape member 236 mounted on the shaft 214 with a fixed drive connection to the corresponding crank handle 243 is utilized and orbiting the latter about the center axis of the shaft 214 causes the latter to rotate independent of a lost motion or limited freedom of rotation connection between the handle 243 and the shaft 214. However, if it is desired to rotate the shaft 214 with a limited freedom of rotation connection established between the shaft 214 and one of the crank handles of the drive connection 226, the crank handle 251 is grasped and orbited about the center axis of the shaft 214.

When the crank handle 251 is being utilized, if the rotary torque input to the crank handle 251 exceeds the pull of the associated fishing line, the crank handle 251 will be angularly displaced in a line-in winding direction ahead of the disk shaped member 236 causing further winding of the spring 255 until such time as the shaft 253 abuts the end of the slot 250 opposite the end thereof toward which the spring 225 yielding biases the shaft 253. Of course, if, during angular displacement of the shaft 253 relative to the slot 250, the rotary torque input to the crank handle 251 exceeds the pull on the associated fishing line, the rotary torque input to the crank handle 251 will be effective in rotating the shaft and thus causing the associated fishing line to be reeled in.

If it is desired to increase the tension of the spring 255 and thus the yieldable resistance to the limited freedom of rotation connection 226, the crank handle 243 may be pulled outwardly against the biasing action of the spring 269 in order to withdraw the pin 276 from the corresponding recess 271 and the cover plate 268 may be rotated in a clockwise direction in order to align the pin 276 with one of the other recesses 271.

Thus it may be seen that the limited freedom of rotation drive connection 226 may be used not only in the same manner as the drive connections 26 and 126, but also in a manner establishing a positive drive connection between the crank handle 243 thereof and the winding member of the reel 212 corresponding to the winding member 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A winding assembly, said assembly including a frame, a winding member rotatably mounted on said frame, a rotary torque input member for rotary driving of said winding member rotatably mounted on said frame, drive train means drivingly connecting said rotary torque input member to said winding member for rotating said winding member in at least one direction in response to rotation of said rotary torque input member in a first direction, said drive train means including a limited relative rotation drive connection connecting said rotary torque input member to said winding member and means defining first and second angularly displaced limit positions of rotational movement of said rotary torque input member in said first direction and a second direction opposite said first direction, respectively, relative to said winding member, said drive train means also including biasing means yieldingly biasing said rotary torque input member toward said second limit position relative to said winding member, said biasing means including adjusting means operative to variably adjust the biasing action thereof acting upon said rotary torque input member to rotate said rotary torque input member toward said second limit position.

2. The winding assembly of claim 1 wherein said limited relative rotation drive connection defines a freedom of relative rotation of less than 360° said torque input member and said winding member.

3. The winding assembly of claim 1 wherein said winding assembly comprises a fishing reel and said frame includes mount structure for support of said winding assembly on a fishing rod.

4. The winding assembly of claim 3 wherein said reel comprises a bait casting reel with the axis of rotation of said rotary torque input member disposed generally parallel to the axis of rotation of said winding member.

5. The winding assembly of claim 3 wherein said reel comprises a spin casting reel with the axis of rotation of said rotary torque input member disposed generally normal to the axis of rotation of said winding member.

6. The winding assembly of claim 5 wherein said rotary torque input member comprises an exterior rotary torque input shaft end upon which a crank handle is mounted and said limited relative rotation drive connection is enclosed within said reel and comprises part of the drive train means drivingly connecting said rotary torque input shaft end to said winding member.

7. The winding assembly of claim 5 wherein said rotary torque input member comprises an exterior rotary torque input shaft end and said limited relative rotation drive connection is mounted on said exterior rotary torque input shaft end.

8. The winding assembly of claim 7 wherein said accessory assembly includes a single crank handle comprising a manual torque input member therefore.

9. The winding assembly of claim 7 wherein said limited relative rotation drive connector includes a pair of crank handles each comprising a manual torque input member.

10. The winding assembly of claim 9 wherein one of said crank handles comprises means for positively driving said exterior rotary torque input shaft end and the other of said crank handles is connected to said exterior rotary torque input shaft end through said limited relative rotation drive connection.

11. A winding assembly, said assembly including relatively rotatable rotary torque input and winding members, drive train means connecting said rotary torque input member to said winding member for rotating the winding member in opposite directions in response to rotation of said rotary torque input member in opposite directions, said drive train means including a limited relative rotation drive connection connecting said rotary torque input member to said winding member and defining first and second angularly displaced limit positions of rotational movement of said rotary torque input member in said opposite directions relative to said winding member, said drive train means also including biasing means yieldingly biasing said rotary torque input member toward one of said limit positions of rotation relative to said winding member, said biasing means including adjusting means operative to variably adjust the biasing action thereof acting upon said rotary torque input member to rotate rotary torque input member toward said one limit position relative to said winding member.

* * * * *